United States Patent
Costa et al.

(10) Patent No.: US 6,221,802 B1
(45) Date of Patent: *Apr. 24, 2001

(54) CATALYST SUPPORT AND CATALYST FOR THE POLYMERIZATION OF α-OLEFINS

(75) Inventors: Jean-Louis Costa, Grimbergen; Vincent Laurent, Houtain-le-Val; Philippe Francois, Court-Saint-Etienne-Faux; Dirk Vercammen, Zele, all of (BE)

(73) Assignee: Solvay Polyolefins Europe-Belgium, Brussels (BE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/008,068

(22) Filed: Jan. 16, 1998

Related U.S. Application Data

(62) Division of application No. 08/629,753, filed on Apr. 9, 1996, now Pat. No. 5,756,613, which is a division of application No. 08/248,218, filed on May 24, 1994, now Pat. No. 5,556,893.

(30) Foreign Application Priority Data

May 25, 1993 (BE) .................................................. 09300539

(51) Int. Cl.[7] ................................. C08F 4/02; C08F 4/42; C08F 4/44
(52) U.S. Cl. ......................... 502/109; 502/102; 502/103; 502/118; 526/160; 526/114; 526/119; 526/904; 526/943
(58) Field of Search ..................................... 502/102, 103, 502/109, 118

(56) References Cited

U.S. PATENT DOCUMENTS

| | | |
|---|---|---|
| 3,901,863 | 8/1975 | Berger et al. . |
| 4,098,979 | 7/1978 | Maemoto et al. . |
| 4,161,462 | 7/1979 | Bocharov et al. . |
| 4,166,167 | 8/1979 | Bye et al. . |
| 4,210,729 | 7/1980 | Hermans et al. . |
| 4,454,198 | 6/1984 | Fickel et al. . |
| 4,617,360 | 10/1986 | Bienfait . |
| 4,703,026 | 10/1987 | Matsuura et al. . |
| 4,940,682 | 7/1990 | Sugano et al. . |
| 5,051,484 | 9/1991 | Sasaki et al. . |
| 5,077,250 | 12/1991 | Miyoshi et al. . |
| 5,206,198 | 4/1993 | Costa et al. . |
| 5,236,962 | 8/1993 | Govoni et al. . |
| 5,346,925 | 9/1994 | Sugano et al. . |
| 5,641,843 | * 6/1997 | Tsutsui et al. ........................ 526/129 |
| 5,756,613 | * 5/1998 | Costa et al. ........................... 526/159 |

FOREIGN PATENT DOCUMENTS

| | | |
|---|---|---|
| 2435609 | 2/1975 | (DE) . |
| 168317 | 7/1984 | (EP) . |
| 168317 | * 1/1986 | (EP) . |
| 0168317 | 1/1986 | (EP) . |
| 0283011 | 9/1988 | (EP) . |
| 0314131 | 5/1989 | (EP) . |
| 0344755 | 12/1989 | (EP) . |
| 0523879 | 1/1993 | (EP) . |
| 523879 | * 1/1993 | (EP) . |
| 2357582 | 2/1978 | (FR) . |
| 87/6968 | 5/1988 | (ZA) . |

OTHER PUBLICATIONS

Periodic Table of the Elements, version published in the Handbook of Chemistry and Physics, 50th edition, p. B–3, 1969–1970.

The Different Crystalline Modifications of TiCl$_3$, a Catalyst Component for the Polymerization of α–Olefins. Journal of Polymer Science, vol. 51, pp. 399–410, 1961.

Communications to the Editor; vol. 6, No. 6, Nov.–Dec. 1973, pp. 925 and 926.

Derwent Publications Ltd., English abstract of EP–A–0168317 to ATOCHEM, 1984.

* cited by examiner

*Primary Examiner*—David W. Wu
*Assistant Examiner*—R. Rabago
(74) *Attorney, Agent, or Firm*—Venable; Marina V. Schneller

(57) ABSTRACT

The invention comprises a catalyst support containing an α-olefin polymer which is in the form of particles of mean size from 5 to 350 μm in which the pore volume generated by the pores of radius from 1,000 to 75,000 Å is at least 0.2 cm$^3$/g. A catalyst usable for the polymerization of α-olefins, including a compound containing at least one transition metal belonging to groups IIIb, IVb, IVb and VIb of the Periodic Table, bound in or on this support, is also described.

3 Claims, No Drawings

CATALYST SUPPORT AND CATALYST FOR THE POLYMERIZATION OF α-OLEFINS

This is a Divisional Application of application Ser. No. 08/629,753 filed Apr. 9, 1996, now U.S. Pat. No. 5,756,613, which is a Divisional of application Ser. No. 08/248,218 filed May 24, 1994, now U.S. Pat. No. 5,556,893, the entire disclosure of which is incorporated herein by reference.

The present invention relates to a catalyst support and to a process for obtaining this support. The present invention also relates to catalysts for the polymerization of α-olefins, obtained starting with these supports, a process for obtaining these catalysts and a process for the polymerization of α-olefins in their presence.

It is known to polymerize α-olefins by means of catalysts deposited in, or on, porous polymeric supports (EP-0283011; EP-0314131 and EP-344755). According to these documents the polymeric supports which give the best results are (co)polymers of styrene and of divinylbenzene and polyvinyl chlorides.

In the manufacture of catalysts for the polymerization of α-olefins, the use of these supports of a chemical nature which differs from those of the final polymers and generally of high weight-average molecular mass in most cases results in α-olefin polymers which do not exhibit the desired best qualities. In particular, when they are used, it is noted that agglomerates originating from the catalysts are formed and deteriorate the properties of the objects obtained.

Furthermore, it is generally difficult to modify the morphology of these supports. Finally, they are generally costly and this reduces the economic advantages of the catalysts thus obtained.

The use of α-olefin polymers as support allows these problems to be partly solved (EP-0523879). This document describes specifically the use, as support, of α-olefin polymer particles larger than 150 μm in size. The use of particles of this size results, ultimately, in the formation of polymer particles of very large size which are difficult to handle and can be conveyed by the usual pneumatic means. Furthermore, the supports employed in this document must be pretreated in order to obtain the desired morphology.

The present invention consequently aims to obtain, in an economically advantageous manner, a polymeric support of a catalyst for the polymerization of α-olefins which is completely compatible with the final polymer and which does not exhibit the disadvantages of the polymeric supports forming part of the prior art.

To this end, the invention concerns, chiefly, a catalyst support including at least one polymer of α-olefin(s) which is in the form of particles with a mean size of 5 to 350 μm and in which the pore volume generated by the pores of radius from 1000 to 75,000 Å ($10^{-10}$ m) is at least 0.2 cm³/g.

α-Olefin polymers are intended essentially to mean the homopolymers and copolymers of α-olefins containing from 2 to 20 carbon atoms, such as, for example, ethylene, propylene, 1-butene, 1-pentene, 1-hexene, methyl-1-butenes, methyl-1-pentenes, 1-octene and 1-decene.

Within the scope of the present invention, α-olefin polymers being considered also include the copolymers of the α-olefins described above with other unsaturated monomers such as, for example, unsaturated organic acids and their derivatives, vinyl esters, aromatic vinyl compounds, vinylsilanes and unconjugated aliphatic and monocyclic diolefins, alicyclic diolefins which have an endocyclic bridge and conjugated aliphatic diolefins.

The polymeric supports according to the present invention are preferably chosen from the homopolymers of α-olefins containing from 2 to 15, preferably from 2 to 8, carbon atoms and the copolymers of these α-olefins with each other. Propylene homo- and copolymers are particularly suitable.

One advantage of the supports according to the present invention is that they are in the form of particles of very variable size. The mean size of these particles can reach values as low as 5 μm. This size is generally larger than or equal to 8 μm and preferably larger than or equal to 15 μm. In most cases these particles have a mean size smaller than or equal to 350 μm, preferably smaller than or equal to 190 μm, and more particularly smaller than or equal to 150 μm. Supports which are particularly preferred have a mean size of 20 to 120 μm.

The pore volume of these supports is also one of their important characteristics. In most cases they have a pore volume generated by the pores of radius from 1,000 to 75,000 Å ($10^{-10}$ m) of at least 0.2 cm³/g. This pore volume is preferably at least 0.3 cm³/g and more particularly at least 0.5 cm³/g.

The polymeric supports according to the present invention generally contain a certain quantity of catalyst residues originating from the catalyst systems (S), as defined below, which have given rise to them. These catalyst residues, expressed as weight of the compound (a) defined below per kg of support, are in most cases of at least approximately 0.3 g, preferably of at least approximately 2 g and more particularly of at least approximately 5 g of compound (a) per kg of support. It is furthermore desirable that this quantity of catalyst residues should be smaller than or equal to approximately 170 g, generally smaller than or equal to approximately 90 g and more particularly smaller than or equal to approximately 60 g of compound (a) per kg of support. Particularly good results are obtained when the quantity of catalyst residue is from 10 to 50 g of compound (a) per kg of support.

It is obvious that the supports which have subsequently been subjected to a treatment aimed at removing these catalyst residues from them are also included within the scope of the present invention.

The use of these supports for the preparation of catalysts for the polymerization of α-olefins make it possible to obtain polymers in which the content of inorganic compounds, generally called ash content, is particularly low.

In a second aspect, the present invention concerns a process for obtaining these supports.

The supports according to the present invention are generally obtained by polymerization of one or more α-olefins as defined above by means of a catalyst system (S) containing a catalytic compound (a) based on a transition metal belonging to groups IIIb, IVb, Vb and VIb of the Periodic Table (version published in the Handbook of Chemistry and Physics, 50th edition, page B-3 —1969–1970) and an activator chosen from organoaluminium compounds and, in general, those containing at least one aluminium-carbon bond and optionally capable of containing oxygen and/or one or more halogens.

The activator is preferably chosen from the compounds corresponding to the overall formula $$AlR^1_x X_{3-x} \tag{I}$$

in which $R^1$ is a hydrocarbon radical containing from 1 to 18 carbon atoms;

X is a halogen; and x is any number such that $0 < x \leq 3$.

The catalytic compound (a) employed for the manufacture of the supports according to the invention is generally in the form of particles whose mean size is at least 2 μm. These particles are preferably such that their mean size is at least 5 μm and more particularly at least 10 μm. This size is generally smaller than or equal to 200 μm, in most cases smaller than or equal to 100 μm and preferably smaller than or equal to 50 μm. The pore volume of these particles of compound (a) generated by the pores of radius from 200 to 15,000 Å ($10^{-10}$ m) is at least 0.02 cm$^3$/g, preferably at least 0.05 and more particularly at least 0.1 cm$^3$/g. This pore volume is furthermore generally smaller than 1 cm$^3$/g.

In most cases this catalytic compound (a) is a solid compound based on TiCl$_3$ of δ crystalline form as defined, for example, in Journal of Polymer Science 51, pages 399–410 (1961), obtained by a process involving the reduction of a tetravalent titanium compound with an organoaluminium reducing agent.

A catalytic compound (a) is preferably employed which is obtained by heat treatment, in the presence of a halogen-containing agent, of the liquid material resulting from placing titanium tetrachloride (TiCl$_4$) pretreated with an electron-donor compound, in contact with a composition (D) corresponding to the general formula

$$AlR_p(Y)_qX_{3-(p+q)} \qquad (II)$$

in which
R denotes a hydrocarbon radical;
Y denotes a group chosen from —OR', —SR' and —NR'R" in which each of R' and R" denotes a hydrocarbon radical or a hydrogen atom;
X denotes a halogen;
p is any number such as that $0<p\leq2.5$;
q is any number such that $0.5<q<3$, the sum (p+q) being such that $0.5<(p+q)\leq3$.

In formula (II) each of R, R' and R", in the case where they denote a hydrocarbon radical, is generally chosen, independently from one another, from:
linear or branched alkyl radicals containing from 1 to 12 carbon atoms;
alkenyl radicals containing from 2 to 12 carbon atoms;
optionally substituted cycloalkyl radicals containing from 5 to 12 carbon atoms;
optionally substituted aryl radicals containing from 6 to 35 carbon atoms;
arylalkyl radicals containing from 7 to 20 carbon atoms.

In formula (II) q is preferably greater than 0.65, preferably greater than or equal to 0.7. p is preferably smaller than or equal to 2.45. Good results are obtained when $1\leq p\leq2$.

Composition (D) is preferably such that X is chlorine, R is a linear or branched alkyl radical containing from 1 to 12 carbon atoms, and Y is a group —OR' in which R' is an alkyl or aryl radical as defined above.

For the preparation of the catalytic compound (a) the composition (D) is placed in contact with TiCl$_4$, itself pretreated with an electron-donor compound. This electron-donor compound is generally chosen from organic compounds containing one or more atoms or groups that have one or a number of free electron pairs capable of providing coordination with titanium. The electron-donor compound is preferably chosen from the class of aliphatic ethers and more particularly from those in which the aliphatic radicals containing from 2 to 8 carbon atoms, preferably 4 to 6 carbon atoms. Diisoamyl ether and di-n-butyl ether give particularly good results.

The molar ratio of TiCl$_4$ to the electron-donor compound may vary from 0.0 mole to 20 mols of TiCl$_4$ per mole of electron-donor compound.

The general conditions for placing TiCl$_4$, pretreated with the electron-donor compound (called more briefly "pretreated TiCl$_4$" below), in contact with the composition (D) are not critical, provided that they result in the formation of a substantially homogeneous and solid-free liquid material. In general the composition (D) is introduced, in pure liquid form or in diluted form in an inert hydrocarbon diluent generally chosen from liquid aliphatic, cycloaliphatic and aromatic hydrocarbons such as liquid alkanes and isoalkanes and benzene, into the pretreated TiCl$_4$, itself in liquid form or diluted in an inert hydrocarbon diluent identical with or different from that in which the composition (D) is optionally diluted.

The composition (D) and the pretreated TiCl$_4$ are placed in contact in respective quantities such that an at least partial reduction of TiCl$_4$ takes place without accompanying substantial production of solid precipitate. To this end, the quantity of composition (D) placed in contact with the pretreated TiCl$_4$ is such that the atomic ratio of the aluminium present in the composition (D) to the titanium present in the pretreated TiCl$_4$ is generally between 0.05 and 10.

The temperature at which the contact between the composition (D) and the pretreated TiCl$_4$ is brought about is generally from 0 to 60° C., preferably from 10 to 40° C.

The liquid material thus obtained is then converted into solid particles by heat treatment at a temperature from approximately 20 to approximately 150° C., preferably from approximately 60 to approximately 130° C., in the presence of a halogen-containing agent.

A "halogen-containing agent" is intended to denote all agents whose presence contributes to converting the solid titanium trichloride which is formed during the heat treatment of the liquid material into the violet and stereospecific δ crystalline form.

These agents are generally chosen from inorganic halogen compounds, organic halogen compounds, hydrocarbylaluminium halides, interhalogen compounds and halogens. Inorganic halogen compounds and halogenated hydrocarbons are suitable.

The quantity of halogen-containing agent used is generally between 0.1 and 20 mols of halogen-containing agent per mole of titanium trichloride present in the liquid material.

This halogen-containing agent may be introduced into the reaction mixture at any time of the heat treatment.

Particularly good results are obtained when the halogen-containing agent is TiCl$_4$. In this case the total quantity of TiCl$_4$ used is such that the molar ratio of the titanium used to the radicals R originating from the composition (D) is higher than 2.7.

It is then also found advantageous to use all the TiCl$_4$ from the beginning of the synthesis of the compound (a).

The solid particles based on complexed titanium trichloride which are produced by the heat treatment are next in most cases subjected to a maturing treatment which is generally performed at the temperature reached at the end of the heat treatment. The duration of this treatment is generally from 15 minutes to 24 hours, preferably from 30 minutes to 5 hours.

It may be found advantageous to subject the particles of the catalytic compound (a) to an activation treatment aimed at maintaining the stability of its properties and/or increasing its stereospecificity. This treatment consists in placing the particles of catalytic compound (a), preferably separated from the medium in which they have been prepared, in contact with an activating agent chosen from organoaluminium compounds and the products of the reaction of an organoaluminium compound with a compound chosen from hydroxyaromatic compounds in which the hydroxyl group is sterically blocked. Other details relating to this activation treatment, and especially relating to the nature of the organoaluminium and hydroxyaromatic compounds will be found, with the operating conditions in which this treatment is performed, in patents BE-A-803875 and EP-0261727 (Solvay), the content of which is incorporated by reference in the present description.

Practical details relating to the preparation of the catalytic compound (a) and in particular the nature of the composition (D), the method for its preparation and the operating conditions to be employed will also be found in patent application EP-A-0485006 (Solvay), the content of which is incorporated by reference in the present description.

The compound (a) thus obtained is then preferably separated from its preparation medium, is generally washed and optionally dried before being used in the polymerization reaction described above for preparing the supports according to the present invention. It can also be stored in the form of a suspension in an inert hydrocarbon diluent or in dry form before it is used in the said polymerization reaction.

The titanium trichloride content of these compounds (a) is in most cases higher than or equal to 50% by weight, preferably higher than or equal to 75% by weight. The electron-donor compound content of these compounds (a) is generally lower than or equal to 15% by weight and preferably lower than or equal to 10% by weight.

The compound (a) thus obtained is in the form of particles of substantially spherical shape, with a narrow particle size distribution. Its morphology and in particular its porosity can be adjusted by varying, within the limits described above, the operating conditions of its preparation and in particular the nature of the composition (D).

The polymerization which makes it possible to obtain the support can be performed by any known process whatever: in solution or in suspension in an inert hydrocarbon diluent which is generally chosen from aliphatic, cycloaliphatic and aromatic liquid hydrocarbons such as liquid alkanes, isoalkanes and benzene, or in the monomer, or one of the monomers, which is kept in the liquid state or else in a gaseous phase. The supports are preferably obtained by polymerization in one of the monomers kept in the liquid state or in suspension in an aliphatic hydrocarbon. Good results are obtained when this polymerization is performed in suspension in alkanes.

The polymerization temperature is generally chosen from 0 to 200° C. and preferably from 20 to 90° C. In most cases the pressure is chosen between atmospheric pressure and 50 atmospheres and preferably between 1 and 45 atmospheres. This pressure is, of course, a function of the conditions in which the polymerization is performed.

The polymerization may be performed continuously or non-continuously.

The polymerization is preferably performed in conditions such that a quantity of polymer of at least 5 grams per gram of catalytic compound (a) is formed. The quantity of polymer found is preferably greater than or equal to approximately 10 grams and more particularly greater than or equal to approximately 15 grams per gram of catalytic compound (a). It is also found to be advantageous to perform this polymerization in conditions such that the quantity of polymer formed is lower than or equal to approximately 3300 grams of polymer, preferably lower than or equal to approximately 500 grams and more particularly lower than or equal to approximately 200 grams of polymer per gram of compound (a). Good results are obtained when the quantity of polymer formed is from approximately 20 to approximately 100 g per g of compound (a).

To perform this polymerization, the activator and the catalytic compound (a) may be introduced into the polymerization reactor separately. They may also be placed in contact, at a temperature of between −40° and 80° C., for a period which depends on this temperature and which can range from an hour to several days, before they are introduced into the polymerization reactor.

The total quantity of activator used is not critical; it is generally greater than 0.1 mmol per liter of diluent, of liquid monomer, or of reactor volume, preferably greater than 0.5 mmol per liter.

The quantity of catalytic compound (a) used is preferably determined as a function of its $TiCl_3$ content. It is generally chosen so as to make the concentration in the polymerization medium higher than 0.01 mmol of $TiCl_3$ per liter of diluent, of liquid monomer or of reactor volume, and preferably higher than 0.05 mmol per liter.

The ratio of the quantities of organometallic compound and of catalytic compound (a) is not critical either. It is generally chosen so that the molar ratio of the activator to the $TiCl_3$ present in the catalytic compound (a) is between 0.5 and 20, preferably between 1 and 15. The best results are obtained when this molar ratio is between 2 and 12.

The average molecular weight of the polymers of which the support according to the process of the invention consists can be adjusted by the addition of one or more agents for controlling the average molecular weight to the polymerization medium, such as hydrogen, diethyl zinc, alcohols, ethers and alkyl halides.

The supports thus obtained are in the form of substantially spherical particles of narrow particle size distribution. Their morphology can be easily adjusted as a function of the desired application. In fact, the properties of these supports depend, on the one hand, on the morphology of the compounds (a) which have given rise to them and which can be easily modified as described above and, on the other hand, on the conditions in which the polymerization is performed. In particular, the mean size of the support particles can be adjusted using the quantity of polymer which is formed and its physical properties can be adjusted by varying, for example, the nature of the monomer(s), the quantity of agent for adjusting the molecular mass or by introducing one or more additives which are generally called third constituents into the polymerization medium.

It is found that the morphology of these supports is particularly well suited to the preparation of the catalysts as described below. In particular, the size of the support particles is advantageously such that virtually all of the catalytic compound (b) as described below is bound in the support. Similarly, the use of a support with porosity differing from that described above does not allow the binding of the compound (b) in the support.

It is also found that there is no need to perform any additional treatment of the supports according to the present invention with the aim of modifying their morphological characteristics.

For economic reasons these treatments are consequently preferably avoided. Nevertheless, the treatments intended to remove the catalyst residues originating from the catalyst systems (S) may be performed.

A third aspect of the present invention relates to catalysts that can be employed for the polymerization of α-olefins, including a catalytic compound (b), preferably other than catalytic compound (a) and containing at least one transition metal belonging to groups IIIb, IVb, Vb and VIb of the Periodic Table, bound in, or on, the supports as defined above. The catalytic compound (b) is preferably bound in the support.

According to a first alternative form of the catalysts of the present invention the catalytic compound (b), called simply compound (b) below, is a metallocene compound derived from the transition metals recounted above. In a second alternative form the compound (b) is chosen from solid compounds containing at least titanium, magnesium and chlorine. Finally, according to a third alternative form the compound (b) is chosen from solid compounds based on titanium trichloride complexed with an electron-donor chosen from organic compounds containing one or more atoms or groups which have one or a number of free electron pairs.

These various compounds (b) and the processes for obtaining them are well known to a person skilled in the art and form part of the state of the art.

The catalysts according to the present invention are generally obtained by adding the support as described above to the mixture for the preparation of the compound (b), at any time, so that the catalytic compound (b) is bound in and/or on the said support. For this purpose, use is advantageously made of processes for the preparation of the compound (b), in which the reaction mixture is, at least at some time or other, in the form of a substantially homogeneous liquid material which is free from solid.

In this case the support is preferably added to the said liquid material. It is obvious that the support may also be added to the mixture for the preparation of the said component (b) before such a liquid material is obtained.

By way of example of compounds (b) forming part of the composition of the catalysts according to the first alternative form, there may be mentioned compounds containing at least one neutral metallocene derived from a transition metal and at least one ionizing agent such that the metal of the neutral metallocene is bonded to at least one halogen atom.

The neutral metallocene is usually chosen from the compounds of formula

$$(C_p)_r(C_p')_s MX_t Z_u \qquad (IV)$$

in which each of $C_p$ and $C_p'$ denotes an unsaturated hydrocarbon radical coordinated to the central atom M, it being possible for the groups $C_p$ and $C_p'$ to be bonded by a covalent bridge.

M denotes the transition metal, r, s, t and u denote integers such that (r+s+t+u) is equal to the valency of the transition metal M, t>0, u≧0 and r and/or s≠0, X denotes a halogen, and Z denotes a hydrocarbon radical which may optionally contain oxygen.

The transition metal is preferably selected from scandium, titanium, zirconium, hafnium and vanadium.

Zirconium is particularly suitable. Each of the groups $C_p$ and $C_p'$ advantageously denotes an optionally substituted mono- or polycyclic group containing from 5 to 50 carbon atoms bonded by conjugated double bonds. As a typical example there may be mentioned the cyclopentadienyl, indenyl or fluorenyl radical or a substituted derivative of this radical, in which at least one hydrogen atom is substituted by a hydrocarbon radical containing up to 10 carbon atoms. It may also be a radical derived from an element chosen from group VA of the Periodic Table, for example nitrogen or phosphorus.

The preferred metallocenes of formula (IV) are those in which the groups $C_p$ and $C_p'$ are chosen from cyclopentadienyl, indenyl and fluorenyl radicals. Good results are obtained with those in which the groups $C_p$ and $C_p'$ are bonded by a covalent bridge of the alkyl type. The metallocenes in which the transition metal is chosen from titanium, zirconium and hafnium are very suitable. Particularly satisfactory results are obtained with metallocenes derived from zirconium.

According to the invention an ionizing agent is intended to denote a compound containing a first part which exhibits the properties of a Lewis acid and which is capable of ionizing the neutral metallocene, and a second part which is inert towards the ionized metallocene and which is capable of stabilizing the ionized metallocene. The ionizing agent may be an ionic compound containing a cation exhibiting the properties of a Lewis acid and an anion forming the abovementioned second part of the ionizing agent. Organoborates are anions that have produced very good results. Organoborates are intended to denote a boron derivative on which the boron atom is bonded to 4 organic substituents. Examples of ionic ionizing agents that may be mentioned are triphenylcarbenium tetrakis(pentafluorophenyl)borate, N,N-di-methylanilinium tetrakis(pentafluorophenyl)borate and tri-(n-butyl) ammonium tetrakis (pentafluorophenyl) borate. The preferred cationic Lewis acids are carbenium, sulphonium and oxonium.

Very particularly preferred ionizing agents are those containing a cation of the carbenium type.

In an alternative form the ionizing agent may also be a nonionic compound exhibiting properties of a Lewis acid, which is capable of converting the neutral metallocene into cationic metallocene. To this end, the ionizing agent itself is converted into an anion which is inert towards the cationic metallocene and capable of stabilizing the latter. Examples of nonanionic ionizing agent which may be mentioned are tris (pentafluorophenyl)boron, triphenylboron, trimethylboron, tris(trimethylsilyl)borate and organoboroxines.

The ionizing agent is preferably selected from triphenylcarbenium tetrakis(pentafluorophenyl)borate and tris (pentafluorophenyl)boron.

Triphenylcarbenium tetrakis/pentafluorophenyl)borate is particularly suitable.

The individual compounds (b) thus defined usually contain:

from 0.1 to 30% by weight of the transition metal, typically from 0.2 to 20% by weight, from 0.5 to 10% by weight being the most common ones;

from 1 to 50% by weight of halogen, advantageously from 5 to 30t by weight.

This compound (b) generally contains the ionizing agent in a quantity which is sufficient to be capable of ionizing most (for example at least 80% by weight) and preferably all of the neutral metallocene. The respective optimum quantities of halogenated neutral metallocene and of ionizing agent in the compound (b) will consequently depend on the metallocene and on the ionizing agent selected. In practice, the compound (b) advantageously contains quantities of a neutral metallocene and of ionizing agent in a molar ratio of 0.5 to 2; they are preferably substantially equimolar. The weight ratio of the neutral metallocene to the ionizing agent is preferably from 0.1 to 10, in particular from 0.2 to 2.

The catalysts according to the first alternative form may be obtained by successively impregnating the supports according to the invention with a solution of the neutral metallocene and then with the ionizing agent in an inert hydrocarbon diluent such as described above in relation to the preparation of the supports according to the invention. Aromatic hydrocarbons are particularly suitable in this particular case.

The order in which these impregnations are performed is not critical. In most cases it is preferable to impregnate the support firstly with the neutral metallocene and then with the ionizing agent.

The respective quantities of the metallocene-based compound, of the ionizing agent-base compound and of the support which are used are generally such that the quantity of the compound (b) present in the catalyst is that described below.

The quantities of the compound based on a metallocene and of the compound based on an ionizing agent which are used are usually in a molar ratio of 0.5 to 2; they are preferably equimolar.

The temperature at which the impregnations are performed may be any temperature lower than the decomposition temperature of the neutral metallocene and of the compound based on an ionizing agent. The temperature consequently depends on the nature of these constituents; it is generally at least equal to 0° C., preferably 20° C.; values which are at most equal to 100° C. being the most commonplace and those below 60° C., for example 50° C., being the most advantageous.

The duration of the impregnations is not critical. It is generally at least 1 min, preferably 20 min; for reasons of economic nature it is desirable that it does not exceed 50 h, in particular should not exceed 30 h. A period of approximately 1 h to approximately 5 h is particularly suitable.

In the second alternative form, the catalysts according to the invention contain a compound (b) chosen from the solid compounds containing at least titanium, magnesium and chlorine. Examples of these compounds (b) which may be mentioned are compounds containing a titanium halide supported on magnesium chloride or solid complexes of titanium and magnesium chloride.

When these catalysts are employed for the polymerization of propylene, the compound (b) generally also contains at least one electron-donor compound. The electron-donor compound is advantageously chosen from esters of carboxylic acids. Esters of aromatic mono- or dicarboxylic acids are particularly suitable.

The preferred catalysts according to the second alternative form are obtained by introducing the support into a liquid material containing at least one titanium compound and a magnesium compound.

Examples of these compounds and of these liquid materials can be found in U.S. Pat. No. 3,901,863 and U.S. Pat. No. 4,617,360 (Solvay) and in U.S. Pat. No. 4,703,026, the content of which is incorporated by reference in the present description.

The suspension thus obtained is next generally treated so that the compound (b) is bound in the support. For this purpose the suspension may be advantageously treated with a halogen compound. In most cases this compound is chosen from organic halogen compounds, inorganic halogen compounds and organometallic halides. Examples of suitable organometallic halogen compounds which may be mentioned are organoaluninium chlorides containing one or a number of linear or branched alkyl radicals containing from 1 to 20 carbon atoms. Inorganic halogen compounds which also give good results are titanium and silicon halides. Titanium and silicon tetrachlorides are suitable.

The conditions of these treatments are chosen so that the quantity of compound (b) present in the catalyst is that described below. Examples of these conditions can also be found in the patents cited below.

When the liquid material contains magnesium chloride and a titanium alcoholate, it is found to be advantageous to add silicone oils such as polysiloxanes to the said liquid material. Polydimethylsiloxanes are suitable. The quantity of these oils is generally such that the weight ratio of this oil to magnesium chloride is higher than or equal to 4, preferably higher than or equal to 7. Good results are obtained when this weight ratio is lower than or equal to 100, preferably lower than or equal to 70.

Examples of preferred catalysts according to the third alternative form which may be mentioned are the catalysts obtained by a heat treatment, in the presence of a halogen-containing agent and of the support particles described above, of the liquid material obtained by placing $TiCl_4$ pretreated with an electron-donor compound in contact with a composition (O) corresponding to the general formula $$AlR_m(Y)_nX_{3-(m+n)} \quad \text{(III)}$$

in which
R denotes a hydrocarbon radical;
Y denotes a group chosen from —OR', —SR' and —NR'R" in which each of R' and R" denotes a hydrocarbon radical or a hydrogen atom;
X denotes a halogen;
n is any number such that $0<n\leq0.5$;
m is any number such that $0<m<3$, the sum (m+n) being less than or equal to 3.

In formula (III) n is preferably a number smaller than 0.45 and preferably smaller than or equal to 0.4. Compositions (O) of formula (III) which give good results are generally such that $1\leq m\leq 2$.

The composition of the liquid material obtained during the preparation of this compound (b) is preferably different from that of the liquid material obtained during the preparation of the compound (a).

The nature of the $TiCl_4$ pretreated with the electron-donor compound, that of the halogen-containing agent and the conditions in which the placing the composition (O) in contact with this $TiCl_4$ and the heat treatment are performed are identical with those described above for obtaining the compound (a).

The preferred halogen-containing agent here is again $TiCl_4$. In this case it may be found desirable to use all of this $TiCl_4$ in a single quantity from the beginning of the synthesis of the catalyst. The total quantity of $TiCl_4$ used is such that the molar ratio of the titanium used to the radicals R present in the composition (0) is lower than or equal to 2.7.

The catalyst particles thus obtained may also be subjected to the maturing and/or activation treatments as described above in relation to the compound (a).

The catalysts according to the invention have an appearance which is identical with that of the supports employed when they are being obtained.

Generally spherical in shape, they are from 5 to 350 μm in size. This size is generally greater than or equal to 8 μm and preferably greater than or equal to 15 μm. In most cases the average size of the catalysts according to the invention is smaller than or equal to 190 μm and more particularly smaller than or equal to 150 μm. The preferred catalysts are between 20 and 120 μm in size. The particle size distribution of the catalysts according to the invention is generally narrow. Their composition is generally such that the content of compound (b) is at least 20 g per kg of catalyst, preferably at least 80 and more particularly at least 150 g per kg of catalyst. In most cases the catalyst according to the present invention contain less than 850 g of compound (b) per kg, preferably less than 700 and more particularly less than 600 g of compound (b) per kg of catalyst.

The α-olefin polymer content is furthermore in most cases higher than or equal to 150 g per kg of catalyst, preferably higher than or equal to 300 g. This content is furthermore generally lower than 980 g per kg of catalyst and more particularly lower than 920 g per kg of catalyst.

Whatever their morphology, the catalysts according to the present invention exhibit high activity and stereospecificity. In particular, no lowering of the catalytic activity is observed when the pore volume increases and/or the particle size increases.

Finally, the present invention relates to a process for the homo- and/or copolymerization of α-olefins containing from 2 to 20 carbon atoms, in which one or more α-olefins as defined above is (are) placed in contact, in polymerizing conditions, with a catalyst system (T) containing the catalyst defined above and an activator chosen from the organoaluminium compounds as defined above in relation to the catalyst system (S). This catalyst may be identical with, or different from, that employed for the catalyst system (S).

The catalyst systems (T) which can be employed in the processes according to the invention may also contain at least one third constituent known to improve their stereospecificity and/or their activity.

A particularly advantageous polymerization process relates to the polymerization of ethylene, propylene, 1-butene and 4-methyl-1-pentene to crystalline polymers by means of a catalyst system (T). These catalyst systems (T) also apply to the copolymerization of alpha-olefins with at least one nonidentical comonomer chosen from alpha-olefins whose molecule contains from 2 to 18, and preferably from 2 to 6, carbon atoms and diolefins containing from 4 to 18 carbon atoms.

These catalyst systems (T) also apply to the manufacture of so-called block copolymers which are formed by starting with α-olefins or diolefins. These block copolymers consist of distinct blocks of variable composition; each block consisting of a homopolymer of an α-olefin or of a copolymer containing an alpha-olefin and at least one comonomer chosen from alpha-olefins and diolefins. The α-olefins and the diolefins are chosen from those referred to above.

The catalyst systems (T) according to the invention are suitable for the polymerization of ethylene and for the stereospecific polymerization of propylene. They are particularly suitable for the manufacture of propylene homopolymers and of its copolymers containing in total at least 50% by weight of propylene and preferably at least 60% by weight of propylene. They are also suitable for the manufacture of ethylene homopolymers and of its copolymers containing, in all, at least 50% by weight of ethylene and preferably at least 60% by weight of the latter.

The operating conditions in which this polymerization may be performed are similar to those defined above in relation to the preparation of the supports.

An advantage of the present invention is that it is possible to obtain porous and highly active catalysts. The use of such catalysts makes it possible, in very advantageous conditions, to obtain copolymers containing high quantities of comonomers.

The use of the most porous catalysts for obtaining these copolymers is chiefly advantageous in processes in which the monomers are kept in the gaseous phase.

The following examples are used to illustrate the invention.

The meanings of the symbols employed in these examples, the units expressing the quantities referred to and the methods for measuring these quantities are detailed below.

The porosity of the catalytic compounds (a), of the supports and of the catalysts is measured by the mercury penetration method by means of porosimeters marketed by Carlo Erba Co. in the pore radius region of between 75 and 75,000 Å ($10^{-10}$ m). The curve of the pore volume expressed in $cm^3/g$ as a function of the pore diameter is thus obtained.

The mean diameter of the particles of support, of catalyst and of polymer is estimated by observation with an optical microscope (200 magnification) of these particles, suspended in decalin.

Ds=mean diameter of the support particles in $\mu$m.
PVS=internal pore volume of the support, generated by the pores of radius from 1,000 to 75,000 Å ($10^{-10}$ m), expressed in $cm^3/g$.
Da=mean diameter of the particles of catalytic compound (a), expressed in $\mu$m.
PVa=pore volume of the catalytic compounds (a), generated by the pores of radii from 200 to 15,000 Å ($10^{-10}$ m), expressed in $cm^3/g$.
Dc=mean diameter of the catalyst particles, expressed in $\mu$m.
PVc=pore volume of the catalysts, generated by the pores of radii of between 200 and 15,000 Å ($10^{-10}$ m), expressed in $cm^3/g$.
α=catalyst activity, conventionally expressed in grams of polymer insoluble in the polymerization medium, obtained per hour and per gram of $TiCl_3$ present in the catalyst. This activity is assessed indirectly from the determination of the residual titanium content in the polymer using X-ray fluorescence.
Prod=quantity of polymer formed during the polymerization tests, expressed in kg of polymer per g of titanium.
P=quantity of polymer formed, expressed in gram of polymer per g of catalyst used.
Dp=mean diameter of the polymer particles, expressed in $\mu$m.
ASW=apparent specific weight of the insoluble polymer fraction, expressed in $g/dm^3$.
fTri=isotacticity index of the polymer, assessed as the molar fraction of isotactic triads (chain sequence of three propylene monomer units in meso configuration) in the total polymer. This value is determined by $^{13}C$ nuclear magnetic resonance, as described in Macromolecules, Volume 6, No. 6, page 925 (1973).
MFI=melt flow index measured under a 2.16 kg load at 230° C. and expressed in g/10 min (ASTM standard D 1238 (1986)).
Isoamyl=isoamyl radical $(CH_3)_2CH-CH_2-CH_2-$.
MI=melt flow index measured under a 2.16 kg load at 190° C. and expressed in g/10 min (ASTD standard D 1238 (1986)).
HLMI=melt flow index measured under a 21.6 kg load at 190° C. and expressed in g/10 min (ASTM standard D 1238 (1986)).
HLMI/MI=measurement of the molecular weight distribution of the polymers.

EXAMPLES 1 TO 2

A—Preparation of the Catalytic Compound (a)

100 ml of hexane and 69 ml (340 mmol) of diisoamyl ether (DIAE) are introduced into a one-liter reactor fitted with a single-bladed stirrer rotating at 350 rev/min, purged with nitrogen beforehand.

While this solution is maintained at 30° C., 60 ml of $TiCl_4$ are added to it over 30 minutes.

After this addition, a composition (D) of empirical formula $AlEt_{1.2}$ (O Isoamyl)$_{0.8}$Cl, obtained beforehand by placing 80 ml of hexane successively in contact with 17 ml (136 mmol) of diethylaluminium chloride (DEAC) and 12 ml of isoamyl alcohol is introduced over one hour. The molar ratio of the titanium to the ethyl radical is 3.3.

The temperature is then gradually increased to reach 100° C. after 2 hours. The first solid particles appear during this heat treatment. The suspension is maintained at this temperature for one hour (maturing) and is then returned to ambient temperature.

The liquid phase is then separated from the catalytic compound (a) by decanting and the latter is washed with hexane and dried under a nitrogen stream.

This catalytic compound (a), purplish-blue in colour, contains 814 g of $TiCl_3$ per kg; the Da and the PVa are 15 and 0.1 respectively.

B—Preparation of the Supports 220 ml of hexane, 25 ml of a solution containing 80 g/l of DEAC in hexane and approximately 1 gram of compound (a) prepared above are introduced in succession into a preconditioned 1-1 autoclave. After the temperature has been brought to 30° C., a quantity of propylene in accordance with the information in Table I below is introduced, care being taken not to exceed 1.5 bars of propylene in the autoclave. When the partial pressure of propylene has become almost zero again the support is washed with hexane.

The characteristics of these supports are also given in Table I. As in Example 1, a proportion of the support is removed, washed and dried in order to determine its characteristics.

C—Preparation of the Catalysts 23 ml (45.2 mmol) of DIAE are added at 30° C. to the autoclave containing the support and then 20 ml of $TiCl_4$ are introduced over half an hour.

While this suspension is maintained at 30° C., a composition (O) of empirical formula $AlEt_{1.75}$ (O Isoamyl)$_{0.25}$Cl, obtained beforehand by placing 27 ml of hexane in succession in contact with 6 ml of DEAC and 1.3 ml of isoamyl alcohol is introduced over one hour. The molar ratio of the titanium to the ethyl radical is 2.3.

The temperature is then gradually increased to reach 100° C. after 1 hour. This temperature is maintained for two hours before being returned to ambient temperature.

The liquid phase is then separated from the catalyst by decanting and the latter is then washed with hexane and dried under a nitrogen stream.

The properties of these catalysts, purplish-blue in colour, are listed in Table I.

D—Polymerization of Propylene in Suspension in the Liquid Monomer in the Presence of the Catalytic Solids (Reference Conditions)

The following are introduced under dry nitrogen purging into a predried 5-1 autoclave:
400 mg of DEAC (in the form of a solution in hexane at a concentration of 80 g/l);
a quantity of catalytic solid such that the quantity of $TiCl_3$ introduced is approximately 60 mg (the molar ratio of DEAC to the $TiCl_3$ present in the solid is thus approximately 10);
hydrogen under a partial pressure of approximately 1 bar;
3 l of liquid propylene.

The reactor is maintained at 65° C. with stirring for 3 hours. The excess propylene is then degassed and the polypropylene (PP) formed, which is in the form of grains of uniform morphology, is recovered.

The results obtained during polymerization tests with the various catalytic solids are also listed in Table I below.

TABLE I

| Examples | 1 | 2 |
|---|---|---|
| Preparation of the supports | | |
| Weight of compound (a) (g) | 0.6 | 1.6 |
| Quantity of propylene (g) | 35 | 25 |
| Ds | 90 | — |
| PVs | 0.77 | — |
| Composition (g of support/g compound (a) used) | 40 | 11 |
| Surface appearance | irregular | irregular |
| Characterization of the catalysts | | |
| $TiCl_3$ content (g/kg) | 361 | 506 |
| Dc | 90 | 40 |
| PVc | 0.2 | 0.28 |
| Surface appearance | irregular | irregular |
| Polymerization results | | |
| α | 4140 | 3770 |
| ASW | 280 | 348 |
| fTri | 93 | 94 |
| MFI | 6.7 | 2.6 |

COMPARATIVE EXAMPLE 3R 100 ml of a dry mixture of aliphatic hydrocarbons boiling at 175° C. (marketed by Exxon Chemical under the name of Isopar H) and 60 ml of $TiCl_4$ are introduced into a one-liter reactor fitted with a single-bladed stirrer rotating at 250 rev/min and purged with nitrogen before-hand.

While this solution is maintained at 30° C., 69 ml (340 nmol) of diisoamyl ether (DIAE) are added to it over 30 minutes.

After this addition, a composition of empirical formula $AlEt_{1.4}$ (O Isoamyl)$_{0.6}$Cl, obtained beforehand by placing 80 ml of ISOPAR successively in contact with 17 ml (136 mmol) of diethylaluminium chloride (DEAC) and 9 ml of isoamyl alcohol is introduced over half an hour. The temperature is then gradually increased to reach 100° C. after 1 hour. The first solid particles appear during this heat treatment. The suspension is maintained at this temperature for two hours (maturing) and is then returned to ambient temperature.

The liquid phase is then separated from the catalytic compound (a) by decanting and the compound (a) is washed with hexane and dried under a nitrogen stream.

This catalyst, purple-blue in colour, contains 770 g of $TiCl_3$ per kg, its Dc is between 15 and 25, and its PVc is 0.18.

When subjected to the polymerization test as described in Example 1, this catalyst results, with an activity α of 2,200, in the formation of a polymer which has an ASW of 318, an MFI of 25.1 and an fTri of 93.

Comparison of this test with the examples according to the invention shows that the latter exhibit a particularly high activity even when their pore volume is high.

EXAMPLES 4 AND 5

The catalyst of Example 4 is obtained in a manner which is identical with that employed for Example 1, but with hexane replaced with ISOPAR in stages A and C. In addition, in stage A, the temperature is increased to 100° C. over one hour and is then maintained at this value for 2 hours.

The catalyst of Example 5 is obtained by reproducing that of Example 3 but with the addition of 14.8 ml of isoamyl alcohol in stage A. The empirical formula of the composition (D) thus obtained is $AlEt_1 (O\ Isoamyl)_1Cl$.

The characteristics of these examples are listed n Table II below.

TABLE II

| Examples | 4 | 5 |
|---|---|---|
| Preparation of the supports | | |
| Weight of compound (a) (g) | 2.3 | 1.6 |
| Da | 20 | 25 |
| PVa | 0.2 | 0.17 |
| Quantity of propylene (g) | 70 | 65 |
| Ds | 90 | 120 |
| PVs | 0.75 | 0.55 |
| Composition (g of support/g compound (a) used) | 21 | 28 |
| Surface appearance | irregular | smooth |
| Characterization of the catalysts | | |
| $TiCl_3$ content (g/kg) | 296 | 252 |
| Dc | 90 | 120 |
| PVc | 0.44 | 0.22 |
| Surface appearance | irregular | smooth |
| Polymerization results | | |
| α | 3570 | 3700 |
| ASW | 336 | 347 |
| fTri | 91 | 91 |
| MFI | 6.1 | 5.8 |

EXAMPLES 6 AND 7

These examples illustrate the preparation of catalysts in which the compound (b) contains a titanium derivative supported on magnesium chloride.

The catalytic compound (a) is prepared as described in Examples 1 and 2, point A.

The support is obtained by reproducing part B of Examples 1 and 2. The quantities of reactants used for the preparation of these supports are given in Table III below.

Before being employed for the preparation of the catalysts, the support is treated, under inert atmosphere, with 12.5 ml of anhydrous ethanol for 30 minutes at 80° C. and is washed with hexane. This treatment is then repeated a second time and the support is dried. These final treatments, which are intended to remove the catalyst residues originating from the catalytic compound (a), do not alter the morphology of the supports.

Preparation of the Catalysts 100 ml of a solution obtained beforehand by mixing 76 g of magnesium chloride and 550 ml of titanium tetra-n-butylate ($Ti(OBu_4)$) in 400 ml of heptane at 90° C. for 4 hours are introduced under nitrogen into a preconditioned 1-liter autoclave.

420 ml of hexane, 100 ml of silicone oil marketed by Dow Corning under the name of FLUID 200 (50 cSt) are then added, as is the quantity of support mentioned in Table III below.

While the temperature is maintained at 10° C., 37 ml of $SiCl_4$ are introduced over 2 hours before the temperature is gradually increased to reach 100° C. after one hour. This temperature is maintained for two hours.

The solid phase is then isolated by decantation, washed with hexane, and 375 ml of hexane and 42 ml of $TiCl_4$ are added to it successively over 1 hour at ambient temperature. The temperature is then gradually increased to reach 100° C. after one hour and is maintained at this value for another two hours.

After separation and washing of the solid phase, 1.1 ml of diisobutylphthalate are added to it. The temperature is then gradually increased to reach 100° C. after one hour and is maintained at this value for one hour.

The solid phase is then isolated by decantation and is washed with hexane before 42 ml of $TiCl_4$ are added to it over half an hour. The temperature is then again increased to reach 100° C. after one hour and is maintained at this temperature for two hours.

Finally, the catalyst is isolated by decantation, washed with hexane and dried.

Polymerization of Propylene

The polymerization of propylene in the presence of these catalysts is performed in conditions which are similar to those described in Examples 1 and 2 point D, except in so far as the time (1 h) and the temperature (70° C.) are concerned.

The catalyst system (T) used contains 2 mmol of trialkylaluminium (TEAL), 0.2 mmol of diphenyldimethoxysilane and a quantity of catalyst such that the molar ratio of the titanium present in the catalyst to the aluminium in the TEAL is 200.

The results of these two tests and the analysis of the catalysts are given in Table III below.

TABLE III

| Examples | 6 | 7 |
|---|---|---|
| Preparation of the supports | | |
| Weight of compound (a) (g) | 1.25 | 1.25 |
| Quantity of propylene (g) | 36 | 36 |
| Ds | 80 | 80 |
| PVs | 0.75 | 0.75 |
| Composition (g of support/g compound (a) used) | 20 | 20 |
| Surface appearance | irregular | irregular |
| Characterization of the catalysts | | |
| g of support used | 25 | 50 |
| Titanium content (g/kg) | 4.2 | 2.5 |
| Magnesium content (g/kg) | 50 | 38 |
| Dc | 80 | 80 |
| Surface appearance | irregular | irregular |
| Polymerization results | | |
| Prod | 1390 | 1200 |
| fTri | 0.93 | 0.93 |
| ASW | 283 | 286 |
| MFI | 13 | 8.2 |

EXAMPLE 8

Into an autoclave containing 25 g of support as described in Examples 6 and 7 are introduced in succession, at ambient temperature, 434 ml of hexane and 20.8 ml of a solution consisting of 12.3% by weight of magnesium diethylate and 73.2% by weight of titanium tetra-n-butylate and 14.5% by weight of hexane.

While this suspension is maintained at 35° C., 44.5 ml of a solution containing 390 g/l of ethylaluminium dichloride in hexane are added to it at a constant rate over 2 h. When the addition is complete, the temperature is raised to 60° C. and the suspension is maintained at this temperature for another 1 h. The catalyst is then isolated, washed and dried.

The composition of the catalyst, brown in colour, is the following: Ti 5.2% by weight, Mg 1.5% by weight, Al 0.48% by weight and Cl 12.5% by weight.

This catalyst is next employed for the polymerization of ethylene in suspension in hexane in the presence of the catalytic solid.

The following are introduced under dry nitrogen purging into a predried 3-1 autoclave:
1 l of hexane
228 mg of TEAL (in the form of a solution at a concentration of 40 g/l in hexane).

The autoclave is isolated and the nitrogen purging is stopped. The temperature is raised to 85OC. When the temperature has stabilized at 85° C., the following are introduced in succession:
hydrogen at a partial pressure of 2.5 bars.
ethylene at a partial pressure of 6 bars
approximately 30 mg of catalyst, by injection under pressure with approximately 100 ml of hexane.

The reactor is maintained at 85° C. with stirring for 2 h. At the end of the test, the polymer formed, which is in the form of particles of uniform morphology, is recovered.

The results obtained during the polymerization are as follows:
Prod: 140
ASW: 363
MI: 1.2
HLMI/MI: 31.

EXAMPLE 9

This example illustrates the polypropylene polymerization in the gaseous phase.
Preparation of the Catalyst Into the autoclave containing 25 g of support as described in Examples 6 and 7 are introduced successively, at 30° C., 23 ml of DIAE, 20 ml of $TiCl_4$ and then, after 10 minutes, a composition (0) of empirical formula $(AlEt_{1.75}(O ISOamyl)_{0.25}Cl$, obtained as in Examples 1 and 2 part (C). The temperature is then gradually increased (over 1 h) to 100° C. and maintained at this value for 2 hours. The solid phase is isolated by decantation and washed. 28 ml of a solution in hexane containing 80 g of DEAC and 176 g of n-octadecyl 3-(3',5'-di-tert-butyl-4'-hydroxyphenyl) propionate per liter are then introduced over 30 minutes and at 30° C. The suspension is kept stirred for 60 min at 30° C. before isolating the catalyst, which contains 330 g/kg of $TiCl_3$ (Dc=80 and PVc=0.32).
Polymerization of Propylene in Gaseous Phase The following are introduced under dry nitrogen purging into a 5-liter autoclave:
1 mmol of TEAL (in the form of a solution in hexane at a concentration of 80 g/l)
0.25 mmol of DIBDMS (in the form of a 0.1-molar solution in hexane)
a quantity of catalytic solid such that the quantity of $TiCl_3$ introduced is approximately 80 mg (the molar ratio of the TEAL to the $TiCl_3$ present in the solid is approximately 2)
hydrogen at a partial pressure of approximately 1 bar
1 liter of liquid propylene.

The suspension is stirred at 30° C. for 20 minutes.

Propylene is then degassed to 12 bars while the temperature is raised to 75° C. A hydrogen pressure of 1 bar is then introduced, followed by propylene up to a pressure of 25 bars. The polymerization is performed in these conditions for 3 hours before the polymer formed is recovered, which is in the form of particles of uniform morphology. The characteristics of this test are:
α: 3340
ASW: 302
fTri: 95
MFI: 4.3

EXAMPLE 10

This example illustrates the polymerization of ethylene by means of the catalyst described in Example 6.

The polymerization is performed as described in Example 8, but with approximately 100 mg of catalyst being introduced.
The results of this test are:
Prod=645
ASW=313
MI=3.2
Dp=680
HLMI/MI=27.

EXAMPLE 11

Into a 1-1 autoclave containing 25 g of support as prepared in Examples 6 and 7 are introduced successively, at ambient temperature and with stirring, 340 ml of hexane, and 36.6 ml of a solution containing 132 g/l of magnesium diethylate and 143 g/l of titanium tetra-n-butylate in hexane.

While this suspension is maintained at 35° C., 120 ml of a solution containing 127 g/l of isobutylaluminium dichloride in hexane are added to it at constant rate and over 2 h. The liquid phase is removed at ambient temperature and the catalyst is washed with hexane and dried.

Its composition is the following: Ti=0.42%, Mg=1.5%, Al=1.1% and Cl=5.4%.

When subjected to a polymerization test identical with that in Example 8, this catalyst gives the following results:
Prod=208
Dp=540
ASW=276
MI=6.0
HLMI/MI ratio=37

EXAMPLES 12 AND 13

These examples illustrate the use of catalyst containing a metallocene as compound (b).
Preparation of the Catalysts The support is identical with that in Examples 6 and 7.

The catalyst of Example 12 is obtained by introducing 3.6 g of support, 195 mg of dicyclopentadienyl-dichlorozirconium and 20 ml of toluene in succession into a rotary mixer. This mixture is stirred for 15 minutes at ambient temperature, then for 30 minutes at 45° C. and finally for 40 minutes at 57° C. The solvent is then removed under reduced pressure until a free-flowing powder is obtained, which is dried.

The powder is treated at ambient temperature with a solution containing 617.6 mg of triphenylcarbenium tetrakis-(pentafluorophenyl)borate (BF20) in 20 ml of toluene. This mixture is stirred for 30 minutes at ambient temperature before the solvent is removed by distillation at reduced pressure at 30° C.

The catalyst of Example 13 is obtained by successively introducing 2.9 g of support, 511.5 mg of dipentamethylcy-clopentadienyldichlorozirconium and 20 ml of toluene into a rotary mixer. This mixture is stirred for 30 minutes at ambient temperature. The solvent is then removed at 40° C. and at reduced pressure until a free-flowing powder is obtained, which is dried.

The powder is treated at ambient temperature with a solution of 1056 g of BF20 in 20 ml of toluene. This mixture is stirred for 40 minutes at ambient temperature before the solvent is removed by distillation at reduced pressure at 30° C. until a free-flowing and dry powder is obtained.

Ethylene Polymerization 1 mmol of trimethylaluminium (in the form of a solution at a concentration of 50 g/l in hexane) is introduced under dry nitrogen purging into a predried 3-liter autoclave.

The autoclave is isolated and the nitrogen purging is stopped.

1 liter of isobutane is then introduced and the temperature is increased to 50° C. before the following are introduced in succession:

hydrogen at a partial pressure of 0.34 bar
ethylene at a partial pressure of 10 bars
a quantity, as given in Table IV, of the catalyst, by injection under pressure with approximately 100 ml of isobutane.

The polymerization is performed at 50° C. at 10 bars of partial pressure of ethylene for 1 hour.

The results of these tests are given in Table IV below.

TABLE IV

| Examples | 12 | 13 |
|---|---|---|
| Quantity of catalyst used (mg) | 152 | 63 |
| P | 3080 | 1750 |
| ASW | 307 | — |
| DP | 1000 | — |

What is claimed is:

1. A catalyst usable for the polymerization of α-olefins, including a compound (b) containing at least one metallocene derived from a transition metal belonging to the groups IIIb, IVb, Vb and VIb of the Periodic Table bound in or on a support wherein the support includes at least one α-olefin polymer which is in the form of particles of mean size from 5 to 350 μm, in which the pore volume generated by the pores of radius from 1,000 to 75,000 Å is at least 0.2 cm$^3$/g and which is obtained by polymerization of one or more α-olefins by means of a catalyst system (S) containing a catalytic compound (a) based on a transition metal belonging to groups IIIb, IVb, Vb and VIb of the Periodic Table and an activator chosen from organoaluminum compounds, said compound (a) being in the form of particles of mean size from 2 to 200 μm, of pore volume generated by the pores of radius from 200 to 15,000 Å of at least 0.02 cm$^3$/g, wherein the support contains, per kilogram, from 2 to 170 grams of compound (a).

2. A catalyst usable for the polymerization of α-olefins, including a compound (b) containing at least one metallocene derived from a transition metal belonging to the groups IIIb, IVb, Vb and VIb of the Periodic Table bound in or on a support wherein the support includes at least one α-olefin polymer which is in the form of particles of mean size from 5 to 350 μm, in which the pore volume generated by the pores of radius from 1,000 to 75,000 Å is at least 0.2 cm$^3$/g and is obtained by polymerization of one or more α-olefins by means of a catalyst system (S) containing a catalytic compound (a) based on a transition metal belonging to groups IIIb, IVb, Vb and VIb of the Periodic Table and an activator chosen from organoaluminum compounds, said compound (a) being obtained by heat treatment, in the presence of a halogen-containing agent, of the liquid material resulting from placing titanium tetrachloride (TiCl$_4$) pretreated with an electron-donor compound into contact with a composition (D) corresponding to the general formula $$AlR_p(Y)_qX_{3-(p+q)} \qquad (II)$$

in which

R denotes a hydrocarbon radical;

Y denotes a group chosen from —OR', —SR' and NR'R" in which each of R' and R" denotes a hydrocarbon radical or a hydrogen atom;

X denotes a halogen;

p is any number such that $0<p\leq2.5$;

q is any number such that $0.5<q<3$, the sum (p+q) being such that $0.5<(p+q)\leq3$, wherein the support contains, per kilogram, from 2 to 170 grams of compound (a).

3. A catalyst usable for the polymerization of α-olefins, including a compound (b) containing at least one metallocene derived from a transition metal belonging to the groups IIIb, IVb, Vb, and VIb of the Periodic Table bound in or on a support wherein the support includes at least one α-olefin polymer which is in the form of particles of mean size from 5 to 350 μm, in which the pore volume generated by the pores of radius from 1,000 to 75,000 Å is at least 0.2 cm$^3$/g and is obtained by polymerization of one or more α-olefins by means of a catalyst system (S) containing a catalytic compound (a) based on a transition metal belonging to groups IIIb, IVb, Vb and VIb of the Periodic Table and an activator chosen from organoaluminum compounds, said compound (a) being in the form of particles of mean size from 2 to 200 μm, of pore volume generated by the pores of radius from 200 to 15,000 Å of at least 0.2 cm$^3$/g and being obtained by heat treatment, in the presence of a halogen-containing agent, of the liquid material resulting from placing titanium tetrachloride (TiCl$_4$) pretreated with an electron-donor compound into contact with a composition (D) corresponding to the general formula $$AlR_p(Y)_qX_{3-(p+q)} \qquad (II)$$

in which

R denotes a hydrocarbon radical;

Y denotes a group chosen from —OR', —SR' and NR'R" in which each of R' and R" denotes a hydrocarbon radical or a hydrogen atom;

X denotes a halogen;

p is any number such that $0<p\leq2.5$;

q is any number such that $0.5<q<3$, the sum (p+q) being such that $0.5<(p+q)\leq3$, wherein the support contains, per kilogram, from 2 to 170 grams of compound (a).

* * * * *